United States Patent Office 3,378,521
Patented Apr. 16, 1968

3,378,521
ORDERED ORGANOPOLYSILOXANES
Edgar E. Bostick, Scotia, N.Y., assignor to General
Electric Company, a corporation of New York
No Drawing. Continuation-in-part of application Ser. No.
541,539, Apr. 11, 1966. This application Mar. 8, 1967,
Ser. No. 621,449
10 Claims. (Cl. 260—46.5)

ABSTRACT OF THE DISCLOSURE

Organopolysiloxane-alkanol amine copolymers and block organopolysiloxane-oxyalkylene amine copolymers having the general formula A.
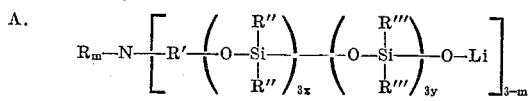

where R is a monovalent hydrocarbon radical, R' is an alkylene radical of from 0 to 1 carbon atoms, or an arylene radical containing up to 20 carbon atoms, R'' and R''' are organic radicals free of aliphatic-substituted halogen and are members of the class consisting of monovalent hydrocarbon radicals, cyanoalkyl radicals, and halogenated aryl radicals, $m$ is a whole number from 0 to 2 inclusive, $x$ is an interger having a value of at least 1 and $y$ is an integer having a value of 0, 1 or more, are produced by forming an admixture of (a) an organo-lithium compound of the formula I
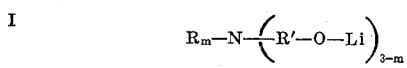

where R, R' and $m$ are as previously defined with (b) a cyclic siloxane of the formula IIa

where R'' is as above-defined and need not represent the same entity on the same silicon atom, in (c) an aprotic solvent for at least one of the reactants and maintaining the admixture at a temperature at which the organo-lithium compound and the cyclic siloxane react to produce the organosiloxane-oxyalkylene amine copolymers, where $x$ is an integer and $y$ is 0. To produce the block-block copolymers, a second cyclic siloxane different from the first and having the formula IIb

where R''' is as above-defined and need not represent the same entity on the same silicon atom, is added and the mixture heated to cause reaction of the copolymer with the second cyclic siloxane to produce the block-block copolymer of Formula I, wherein $x$ and $y$ are integers having values of at least 1. The copolymers of Formula I are useful as dielectric fluids, lubricants, foam additives, etc.

---

This application is a continuation-in-part of my application Ser. No. 541,539, filed Apr. 11, 1966, now abandoned.

This invention relates to sequentially arranged pre-ordained block copolymers in which at least 75% or more and up to close to 100%, of the blocks in the polymer are of a pre-ordained and regular nature and are derived in essentially the same order and the same relative amount as the cyclic organotrisiloxane employed for making the aforesaid polymer.

The polymers of Formula A can be further reacted as hereinafter set forth to produce polymers end-blocked with various groups. Thus, for example, the novel compositions produced in accordance with this invention are represented generically by the formula B.
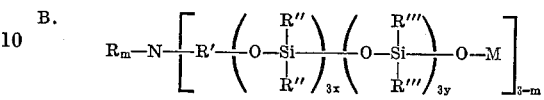

wherein R, R', R'', R''', $m$, $x$ and $y$ are as above defined and M is lithium, hydrogen, acyl or organosilyl.

The term "aprotic solvent" is intended to mean any organic solvent which has no active protons which may interfere with growing anionic polymerization centers. As will be evident to those skilled in the art, any aprotic solvent which is capable of dissolving the polymeric mixture and causing intimate contact of an additional diorganocyclosiloxane with the polymerizing system may be used. These may include such solvents as benzene, toluene, xylene, mesitylene, etc. The use of solvents having different boiling points allows the practice of this invention at variable temperatures. However, it is preferred that certain special dipolar aprotic solvents having electron-donating centers be employed. These solvents are chosen such that their electron-donating centers are capable of forming coordinated complexes with the lithium cation, thereby increasing its reactivity towards diorganocyclosiloxane polymerization without the loss of specificity in ring opening reactions. Aprotic solvents which have Lewis base characteristics are preferably employed because of their ability to donate electrons to the lithium cation, which thereby coordinates with the lithium and enhances its reactivity by virtue of such coordination.

It is known in organosilicon art that cyclic diorganosiloxanes could be polymerized to high polymers by heating them with alkaline catalysts, such as potassium hydroxide or its corresponding siloxane salts. This has become the predominant method for the production of siloxane elastomers. However, during this alklaline polymerization, breaking of the siloxane ring to form high polymers and degradation of high polymers to form cyclics is occurring constantly, and since these polymerization and degradation reactions occur at different rates, the resulting product represents an equilibrium between the two processes. Because of these competing reactions, any polymer which is ultimately formed, if produced from a mixture of cyclic polysiloxanes, contains a random distribution of the segments derived from the different cyclic polysiloxanes involved. These polymers (which term is intended to include copolymers, terpolymers and more complex mixtures of siloxane units) although exhibiting useful properties, due primarily to their gross composition of matter, are highly random in nature. This randomness is often aggravated during copolymerization of two or more organocyclopolysiloxanes by the difference in reactivity of the cyclopolysiloxanes. In addition, it is often difficult to obtain polymerization without significant formation of cyclic polysiloxanes resulting in an undesirable contamination of the finally polymerized product.

Workers in the silicone art have made numerous attempts to reduce or eliminate this randomness in the hope of better controlling the polymerization and condensation reaction. One of the methods for synthesizing organosiloxane block polymers is based on the premise that the homopolymer segments must be prepared separately and then coupled by means of an appropriate condensation catalyst. For instance, in U.S. Patent 3,156,668, issued Nov. 10, 1964, hydroxy chain-stopped polydiorganosiloxanes of the formula

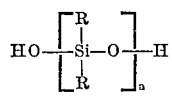

where R has the meaning above and $n$ is a whole number in excess of 1, are heated in the presence of, for example, lithium hydroxide or a lithium silanolate as catalyst to effect condensation of the hydroxy groups and to lengthen the chain. Although this process is intended to minimize the formation of cyclic polysiloxanes, nevertheless, it is apparent that if two different hydroxy chain-stopped polydiorganopolysiloxanes are interacted by this method, the manner in which these polymers will intercondense will again be of a random nature by virtue of the inability to control the points at which each siloxane segment will attach to its neighboring siloxane segment, thus allowing intracondensation as well as intercondensation of siloxane segments. Furthermore, this again leads to the undesirable formation of cyclic polysiloxanes as contaminants and as a limiting factor on the optimum yield of linear polysiloxanes. As a further limitation on this process, the segments must be difunctional and of high purity in order to attain gel-free, high molecular weight, linear polymers. For the foregoing reasons, the ultimate structure and properties of such copolysiloxanes are still difficult to define and may vary widely with slight differences in segment length and reactivity, and preparative conditions.

I have now discovered a means for making block-block copolymers sequentially arranged in a preordained manner by employing the above-described organo-lithium compound with a cyclic organo-trisiloxane using a particular class of solvents for the purpose. In addition to being able to prepare organopolysiloxanes having extremely narrow molecular weight distributions, it has also been possible to effect further polymerization without equilibration, i.e., without any siloxane rearrangement. Thus, once polymer chains are formed, because of their stability to the basic lithium ion, they do not undergo significant equilibration or rearrangement. In addition, by virtue of the high degree of order present in the polymer, the latter have new and unique properties of an unpredictable nature. By means of my process, one can perform custom synthesis of block copolymers, and the properties of the polymer can be varied by the choice of the organopolysiloxane, the segment length, the sequence of segments, and gross molecular weight.

In referring to the blocks comprising the polymers prepared in accordance with the practice of the present invention, it is intended that these blocks include not only single diorganosiloxy trimeric units.

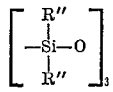

but also a plurality of diorganosiloxy trimeric units linked to each other directly through the oxygen atom. These preordained blocks of diorganosiloxy trimeric units also include from 1 to as many as a 1000 or more trimeric siloxy units derived from the lithium compound. Additionally, by sequentially adding various cyclotrisiloxanes, one can introduce blocks of diorganosiloxy trimeric units of many varieties thereby further modifying the properties of the ultimate products.

The fact that I have been able to produce the above-desired sequential block-block copolymers by means of the above-described process was entirely unexpected and in no way could have been predicted. In the first place, it is important that one employ the above-described organo-lithium compound. When one employs, for example, other alkali-metal compounds in which the lithium atom or atoms of the compound of Formula I is replaced by potassium, any reaction which occurs will lead to equilibrated and random products rather than the pre-ordained, regular block-block copolymers.

It should be recognized that the method of growth of the block polymer can be unidirectional, or can proceed in two or as high as three directions depending on the number of lithium atoms in the organo-lithium compound. For instance, if one were to react hexamethylcyclotrisiloxane with an organo-lithium compound having the formula (III)     $(C_2H_5)_2-N-CH_2CH_2-O-Li$ in the aprotic solvent, one would obtain a composition corresponding to the formula IV 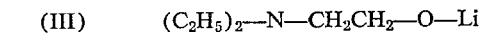

If one employs a molar ratio of one mole of the above-described organo-lithium compound of Formula III per three moles of the hexamethylcyclotrisiloxane, one introduces nine dimethylsiloxy units into the organo-lithium compound yielding a composition having the formula V 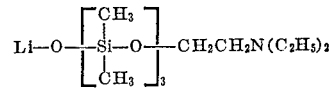

Thus, by working with the previously prepared organo-lithium compound, and using multiples of the cyclotrisiloxane, one can form a lithium-containing polymer, which in addition to having in the polymer the residue from the organo-lithium compound, would also have multiples of the three siloxy groups from the cyclic trisiloxane, the multiples depending on the molar ratio of the trisiloxane to the organo-lithium compound.

Other blocks can then be added on to the polymer of Formula IV. For instance, the latter composition in the aprotic solvent can be further reacted under the same conditions as previously, with hexaphenyl cyclotrisiloxane, to give a lithium compound of the formula VI 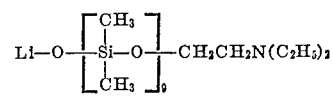

Obviously this interaction with various cyclic trisiloxanes can be continued indefinitely, each time introducing a different segment, if so desired, in a predetermined position to give a pre-ordained tailored polymer in which essentially all the blocks are in the same sequence and amount as the order and molar concentration in which the cyclic polysiloxane is added.

As a further illustration, one can react in an aprotic electron-donating solvent at low temperatures, for instance, the organo-lithium compound of Formula III with trimethyltriphenylcyclotrisiloxane to give a composition of the following structure:

VII 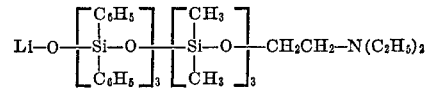

where $w$ is the number of moles of the cyclotrisiloxane per mole of the organo-lithium compound.

In addition to the organo-lithium compound being one which has a single lithium atom, one can also employ lithium compounds containing two or three lithium atoms of the type described in Formula I. By the use of such di- or trilithium compounds, one can effect growth on two or three sides of the units attached to the lithium atoms. Glasses of polylithium compounds effective in the practice of the present invention can be represented generically by the formulas (VIII)     $R-N-(R'-O-Li)_2$ and (IX)     $N-(R'-O-Li)_3$ where R and R' have the meanings given above. Specific examples of dilithium and trilithium compounds in addition to monolithium compounds employed in the practice of the present invention are recited below:

(X)    $CH_3$—N—$(CH_2CH_2$—O—Li$)_2$ (XI)   $(CH_3)_2$—N—$CH_2CH_2$—O—Li
       $C_6H_5$—N—$[CH_2$—$CH(CH_3)]$—O—Li$)_2$
       $C_2H_5$—N—$(C_6H_4$—O—Li$)_2$
       $(C_2H_5)_2$—N—$CH_2$—$CH_2$—$CH_2$—O—Li

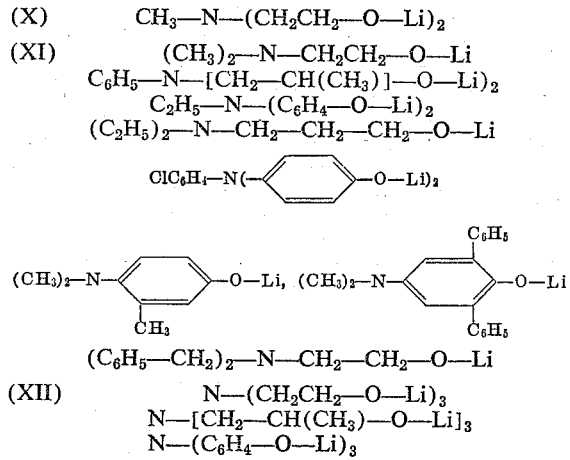

$(C_6H_5$—$CH_2)_2$—N—$CH_2$—$CH_2$—O—Li (XII)  N—$(CH_2CH_2$—O—Li$)_3$
       N—$[CH_2$—$CH(CH_3)$—O—Li$]_3$
       N—$(C_6H_4$—O—Li$)_3$ etc.

The organo-lithium compounds recited above can then be reacted with cyclotrisiloxanes containing different silicon-bonded organic groups (e.g., hexaphenylcyclotrisiloxane, hexamethylcyclotrisiloxane, trimethyltriphenylcyclotrisiloxane, including the latter's various isomers, hexamethylcyclotrisiloxane, etc.) to give linear or branched, ordered, block-block copolymers containing residues from the organo-lithium compound and also siloxane units derived from the cyclotrisiloxane. For example, if one uses according to my process equal molar amounts of hexaphenylcyclotrisiloxane and an organo-lithium compound of Formula XI, a composition of the formula XIII
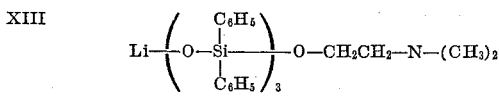

is obtained; with the dilithium compound of Formula X one obtains with hexaphenylcyclotrisiloxane a composition of the formula XIV
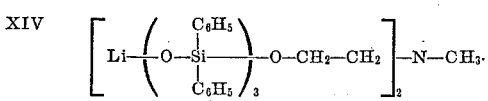

Finally, if one reacts the organo-lithium compound of Formula XII, with hexaphenylcyclotrisiloxane, one obtains a composition of formula XV
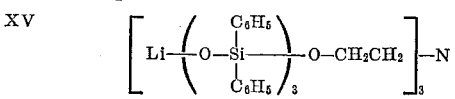

Once the above-described lithium siloxanolates have been formed, the latter can be further reacted if desired with other cyclotrisiloxanes for the purpose of combining additional trisiloxane units or multiples thereof to further lengthen the chain. It should be noted that once the initial reaction has taken place between the organo-lithium compound and the first cyclotrisiloxane, it is possible to interact diorganocyclotetrasiloxanes (for example, tetramethyltetraphenylcyclotetrasiloxane) more readily than if the cyclotetrasiloxane is attempted first to be reacted with the organo-lithium compound. Although there is still danger of some randomness being introduced into the polysiloxane by virtue of the use of the tetrasiloxane as contrasted to the highly ordered result obtained by using the cyclotrisiloxane, nevertheless, the intercession of the first cyclotrisiloxane reaction with the organo-lithium compound materially reduces the randomness effect occasioned by the further interaction with the cyclotetrasiloxane.

Among the members which R, R" and R''' may be in the foregoing Formulas A, I, IIa, IIb and B are, for instance, alkyl radicals (e.g., methyl, ethyl, propyl, isobutyl, hexyl, etc.); aryl radicals (e.g., phenyl naphthyl biphenylyl etc.); aralkyl radicals (e.g., benzyl, phenylethyl, etc.); alkaryl radicals (e.g., tolyl, xylyl, ethylphenyl, etc.); alkenyl radicals (e.g., vinyl allyl, methallyl, etc.); halogenated aryl radicals (e.g., chlorophenyl, tetrachlorophenyl, chloronaphthyl, tetrafluorophenyl, etc.); cyanoalkyl radicals (e.g., cyanoethyl, cyanopropyl, cyanobutyl, etc.); etc. The presence of halogens, particularly fluorine, on an aliphatic carbon attached to silicon in the cyclic polysiloxane in Formula IIa or IIb markedly increases the tendency of the cyclic trisiloxane to form random polymers, thus defeating the purpose of the present invention to maximize the ordered arrangement of units in the formal organopolysiloxane. This precaution of avoiding the presence of halogen or aliphatic carbon does not apply to the radicals which R represents. Accordingly, organo lithium compounds, for instance, of the formulas $(F_3CCH_2)_2$—N—$C_2H_4$—O—Li,
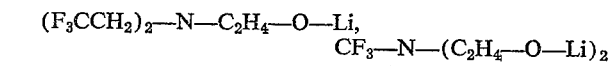

etc., can be used for reaction with the cyclic polysiloxane of Formula II.

The organo-lithium compounds of Formula I can be produced in any one of many well known methods. For example, one can mix at least one mole of lithium hydroxide and one mole of an organonitrogen compound corresponding to formula

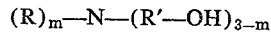

here R, R', and m have the meanings given above. By heating the mixture at about 50° to 70° C. for about ½ hour to 8 hours, one is able to obtain the desired organo-lithium compound. Alternatively, instead of lithium hydroxide one can employ lithium metal for making the organo-lithium compound. As a specific example, one can effect reaction between lithium hydroxide and a stoichiometric amount of either triethanolamine, N-methyl diethanolamine, N,N-dimethyl ethanolamine, etc., with lithium hydroxide to form organo-lithium compounds generically represented by Formula I.

Among the preferred aprotic solvents which may be employed in the practice of this invention are non-acid oxygen-containing and nitrogen-containing organic solvents capable of coordinating with the lithium. These include, for instance, tetrahydrofuran (hereinafter referred to as "THF"), tetrahydropyrane, diethoxyethane, dimethoxyethane, dimethyl ether of diethylene glycol, N,N-dimethyl acetamide, N-methylpyrollidone, isobutylene oxide, dimethyl sulfoxide, dioxane, diethyl ether of diethylene glycol, various tertiary amines such as, for instance, dimethyl aniline, tributyl amine, pyridine etc. Solvents which contain active hydrogen or an acid hydrogen should be avoided because of the reactivity of the lithium with the acidic hydrogen to produce new reaction centers and thereby causing a randomness in the mixture and reducing blocking or order contrary to the intent of this invention.

The fact that such electron-donating solvents react so effectively with the organo-lithium compound was totally unexpected and in no way could have been predicted since the prior art teaches that lithium ions are highly solvated by the above-described media and makes no reference or distinction between lithium and other alkali-metal atoms thus leading to the expectation, contrary to my discovery, that lithium would react in a random fashion similar to that encountered when employing, e.g., sodium, potassium, etc., ions.

The manner in which my invention may be practiced may be varied widely. Thus, the organo-lithium compound is reacted with the organocyclotrisiloxane, preferably in the presence of the aprotic solvent, employing temperatures which vary over wide ranges, for instance from about −50° C. to 250° C. or higher. It is preferred that the initial reaction between the organo-lithium compound and the cyclotrisiloxane be at temperatures below about 200° C. When an electron donating solvent is employed, temperatures as low as −50° C. may be employed. This initial reaction can take place in a time ranging from about 5 minutes to as much as 2 hours or more depending upon such factors as the temperatures employed, the organo-lithium compound used, the particular cyclotrisiloxane, the molar concentrations of the organo-lithium compound and of the cyclotrisiloxane, etc. Thereafter, if it is desired to add on other organosiloxane units to the backbone of the siloxane unit already prepared, one can incorporate in the reaction mixture (employing the same aprotic solvent) whatever other organocyclotrisiloxane is desired for the purpose and in the concentration intended to give the type of product sought. The conditions of addition and reaction are essentially the same as those of the initial organo-lithium compound and cyclotrisiloxane except that in succeeding reactions, temperatures in the order of from 50 to 250° C. are advantageously employed in order to drive the reaction to completion. In all circumstances, anhydrous conditions should be observed, and the exclusion of oxygen by means of an inert atmosphere (e.g., nitrogen, helium, etc.) is advantageously employed.

By means of this sequential addition of the various cyclotrisiloxanes, one can build polymers of any desired length predicting in advance the repetitive unit present in the polymer, its position in the polymer, and the length of the repetitive unit. The length of each segment may be predesigned and will be integrally multiplied in accordance with the molar concentration and the cyclotrisiloxane reacted with the organolithium compound or with successive block polymer reactions more particularly described above.

This ability to predesign polymers and carry out the actual preparations of such polymers allows one to obtain products having unusual characteristics of solubility, heat resistance, crystallinity, improved toughness, flexibility, low temperature flexibility, etc. Quite apart from what might have been predicted from previously prepared copolymers, whereas previous random type polymers made by the polymerization of two cyclic trisiloxanes with materials, such as potassium hydroxide, are of a random type and are soluble in aromatic hydrocarbons such as benzene and toluene, at room temperature, the highly ordered polymers prepared in accordance with my process are relatively insoluble in these solvents and require solvents such as diphenyl ether, or 2,4-dichloroanisole at elevated temperatures (for example, 125 to 225° C.) for solubilization. This resistance to solvents is believed due to the crystallinity of the formed polymers. Polymers of this invention show a variation in crystalline melting points for the different organosiloxy segments.

The lithium block copolymers derived from the reaction of the organo-lithium compound and one or more cyclotrisiloxanes can be treated in various ways to obtain an organopolysiloxane free of lithium atoms. Thus, the final lithium polymer can be reacted with water or carboxylic acid, such as acetic acid, propionic acid, etc., to replace the lithium atom with a hydrogen atom to form a hydroxyl-terminated polysiloxane. One can terminate the lithium block copolymers with an acyloxy group by reacting the lithium block copolymers with a diacylanhydride such as acetic anhydride, butyric anhydride, phthalic anhydride, benzoic anhydride, etc., and acid chlorides such as acetyl chloride, propanoyl chloride, benzoyl chloride, etc. Alternatively, if one wishes to have a triorganosilane or similar terminating organosilicon group, one can react the lithium atom of the finally obtained lithium polymer with, for instance, a triorganohalogenosilane, such as trimethylchlorosilane, triphenylchlorosilane, etc., to obtain lithium chloride and a chain-terminating triorganosilyl group. This can lead to stable fluids having unusual characteristics, especially if highly isotactic structures in excess of 65% isotacticity is present as a result of being able to maintain the high degree of isotacticity from reaction of the organolithium compound and a cis-2,3,6-trimethyl-2,4,6-triphenylcyclotrisiloxane. To insure complete removal of the glacial acetic acid from the polymer, a wash with methanol, particularly with a 90 to 10 percent, by weight, mixture of methanol and water, will remove any residual glacial acetic acid which may be present in the polymer.

In order that those skilled in the art may better understand how the present invention may be practiced the following examples are given by way of illustration and not by way of limitation. Unless otherwise stated all parts and percents are by weight. In each instance unless indicated otherwise, the reaction was conducted under substantially anhydrous conditions and under an inert atmosphere, such as nitrogen.

EXAMPLE 1

Two hundred ml. (0.3 mole) n-butyllithium in n-hexane together with 50 ml. benzene and 50 ml. diethylether was added slowly to 13.3 ml. (0.1 mole) triethanolamine and the reaction mixture was stirred for about one hour after which the precipitate which formed was allowed to settle. The supernatant liquid was removed and the solid precipitate was washed twice with benzene, dried to give 15.1 grams of the compound (XVI) $(Li-O-C_2H_4)_3N$ melting at 195–215° C.

EXAMPLE 2

$0.97 \times 10^{-4}$ mole of the lithium salt of triethanolamine prepared in accordance with Example 1 was stirred with 5 grams hexamethylcyclotrisiloxane in 2 ml. of dry tetrahydrofuran. After heating the mixture of ingredients at the reflux temperature of the mass for about two hours, there was obtained an organopolysiloxane corresponding to the formula below where $x$ and $y$ in this and the succeeding examples are equal to the number of moles of hexamethylcyclotrisiloxane and hexaphenylcyclotrisiloxane, respectively, used:

XVII 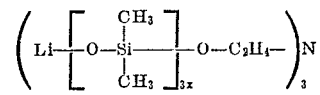

This polymer could be treated with about 3 moles of trimethylchlorosilane per mole of the polymer Formula XVII to give a chain-stopped organopolysiloxane of the formula XVIII 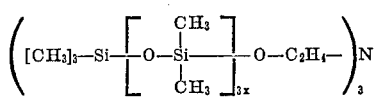

together with lithum chloride.

EXAMPLE 3

A block-block copolymer was prepared from the organolithium polysiloxane composition of the Formula XVII in Example 2 by effecting reaction between 5 grams of hexaphenylcyclotrisiloxane dissolved in 30 ml. benzene and the reaction mixture (including THF solvent) obtained in Example 2 from the reaction of the hexamethylcyclotrisiloxane with the lithium salt of the triethanolamine. The mixture of ingredients was heated at the reflux temperature of the mass for about 30 minutes during which solvent was removed under a nitrogen screen. Thereafter, the reaction mixture was subsequently heated 125° C. for 30 minutes and at about 200° C. for four hours. This yielded a branched block-block copolymer having the formula XIX 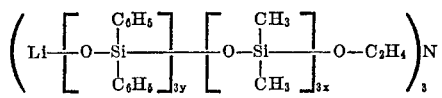

By treating this polymer with acetic acid or acetic anhydride, the lithium atoms could be removed to yield a hydroxy chain-stopped polysiloxane of the formula XX
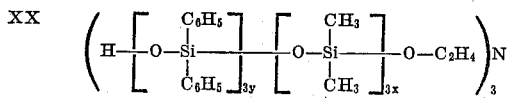

EXAMPLE 4

The dilithium salt of N-methyl-diethanolamine corresponding to the formula (XXI)     (Li—O—C$_2$H$_4$)$_2$N—CH$_3$ is prepared similarly as in Example 1 with the exception that instead of using triethanolamine, N-methyl-diethanolamine is reacted with the n-butyllithium. Employing the conditions recited in Examples 2 and 3, 5 grams hexamethylcyclotrisiloxane is first reacted with the dilithium salt of Formula XXI in 2 ml. of dry tetrahydrofuran and thereafter the product formed is reacted with 5 grams of hexaphenylcyclotrisiloxane, again employing the conditions of Example 3. This produces a block-block copolymer corresponding to the formula XXII
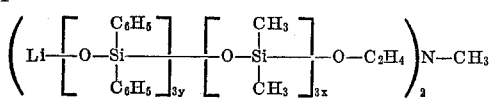

The composition of Formula XII can be treated to remove the lithium atoms and to replace one or both with a triorganosilyl group, hydrogen, or other organosilicon moieties in accordance with the various methods described above.

EXAMPLE 5

The monolithium salt of N,N-dimethyl-ethanolamine corresponding to the formula (XXIII)     Li—O—C$_2$H$_4$—N(CH$_3$)$_2$ is prepared similarly as in Example 1 with the exception that instead of using triethanolamine N,N-dimethyl-ethanolamine is reacted with n-butyllithium. Employing the conditions recited in Examples 2 and 3, five grams of hexamethylcyclotrisiloxane is first reacted with the monolithium salt of Formula XXIII and 2 ml. of dry tetrahydrofuran, and thereafter the formed product is reacted with 5 grams of trimethyl triphenylcyclotrisiloxane, again employing the conditions of Example 3. This produced a regular block-block copolymer corresponding to the formula XXIV
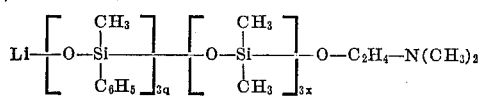

where $q$ is equal to the number of moles of the methylphenyl trimer used.

The composition of Formula XXIV can be treated to remove the lithium atom and to replace it with a triorganosilyl group, hydrogen or other organosilicon moiety in accordance with the various directions recited previously.

EXAMPLE 6

About 3.34 grams of the lithium salt prepared in Example 1 (having the Formula XVI) was suspended in 150 ml. dry freshly distilled tetrahydrofuran, and thereafter 26.6 grams (0.12 mole) hexamethylcyclotrisiloxane was added with stirring under a nitrogen blanket for 6 hours while the mixture was heated at its reflux temperature. The reaction mixture was filtered and the filtrate was evaporated to an oily liquid, redissolved in benzene, washed with water and the organic layer separated. The organic layer was dried and a fluid polymer obtained which had the average general formula

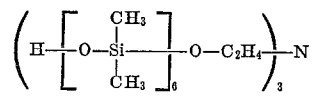

This polymer was found to have a molecular weight in benzene of approximately 1240. This fluid had a decided tendency to stabilize and initiate the formation of foam. Thus, when a few drops of this fluid were added to a benzene-water emulsion, it was found that the emulsion was stable for as long as 4 days with this polymer present. In the absence of this polymer, the emulsion separated within a few hours. This polymer is therefore useful as a surfactant in the making of polyurethane foams.

The polymers prepared in accordance with the practice of my invention have unique and unexpected properties. They can be readily differentiated from prior art compositions even from compositions which were obtained by methods intended to introduce block copolymers. In the first place polymers obtained by means of my process (whether with the lithium atoms or with the lithium atoms replaced) can have at least 98% and closer to 100% pre-ordained regularity of the block segments in the polymer as contrasted to the much lower pre-ordained block segments of a regular nature possible by means of the prior art methods for making block copolymers. In addition, the products of my invention have unusual strengths and elongations, even in the unfilled state, when converted to the cured condition by means of crosslinking agents normally employed for the purpose, such as, benzoyl peroxide, di-(α-cumyl)peroxide, tertiary butyl perbenzoate, etc. The crystallinity introduced by means of the regularity of the polymers herein prepared again imparts a unique characteristic which is not found to the best of my knowledge in polymers of comparable organosiloxane content in the prior art. In particular the insolubility of my polymers even in the uncured state renders them unique in contrast to prior art polymers which exhibit ready solvation characteristics in usual solvents such as benzene, toluene, etc. This insolubility can be translated into improved resistance to swelling in hydrocarbon solvents when these polymers are converted to the infusible, insoluble state by peroxide curing or even by high energy radiation, for instance, high energy electrons.

The ability to obtain unequivocal synthesis of the block copolymers of organocyclosiloxanes results in the attainment of both crystalline and amorphous block segments in a polymer chain, the crystalline segments contributing to solvent resistant, high temperature stability, and tensile strength, while the amorphous segments allow low temperature flexibility or extensibility. These bulk properties can be changed by previous thermal or solvent treatment.

The compositions of the present invention, particularly those in which the lithium atom has been removed and substituted with, for instance, hydrogen, triorganosilyl group, or some other organosilicon moiety, have many uses. They can be mixed with various fillers such as finely divided silica, carbon black, etc., and then crosslinked either by organic peroxides with which organopolysiloxane elastomers are usually cured, or with high energy radiation, as more particularly disclosed and claimed in U.S. Patent 2,763,609, issued Sept. 18, 1965, and assigned to the same assignee as the present invention. In the cured state, these polymers can be used for insulation purposes, for insulating electrical conductors, as encapsulating agents, in capacitors, and as coatings for surfaces which require resistance to moisture and to heat. By the proper choice of organosiloxane units in the polymers, it is possible to make fluids which can be employed as dielectric fluids, in lubricating media, etc. Alternatively the polymers, particularly those free of the lithium atom, can be used for control of foam in liquids which normally are susceptible to foaming. Those organopolysiloxanes containing terminal silicon-bonded hydroxyl groups can be further condensed by dehydrating agents or by organometallic compounds such as iron octoate to give further lengthening of the chains through the medium of the silanol group. In this respect, the hydroxy chain-stopped polysiloxane can be used as an ingredient in making room temperature vulcanizing compositions as is more particularly disclosed in U.S. Patent 2,843,555, Berridge, assigned to the same assignee as the present invention.

It will, of course, be apparent to those skilled in the art that modification other than those set forth in the above examples can be employed in the process of this invention without departing from the scope thereof.

What I claim as new and desire to secure by Letters Patent of the United States is:

1. The process for producing organopolysiloxane copolymers of the formula

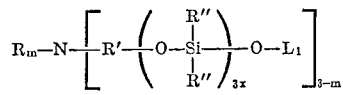

where R is a monovalent hydrocarbon radical, R' is an alkylene radical of from 1 to 10 carbon atoms, or an arylene radical containing from 6 to 20 carbon atoms, R'' is an organic radical free of aliphatic-substituted halogen and is a member selected from the class consisting of monovalent hydrocarbon radicals, cyanoalkyl radicals, and halogenated aryl radicals, $x$ is an integer having a value of at least 1, and $m$ is a whole number equal to from 0 to 2 inclusive, which comprises forming an admixture of an aprotic solvent, an organo-lithium compound corresponding to the formula $(R)_m$—N—$(R'$—O—Li$)_{3-m}$, and a cyclic polysiloxane of the formula

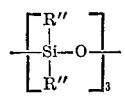

wherein R, R' and R'' are as above defined and maintaining the admixture under anhydrous conditions at a temperature at which said organo-lithium compound and said cyclic polysiloxane react to produce said organosiloxane copolymers.

2. The process as in claim 1 in which the aprotic solvent is tetrahydrofuran and the cyclic polysiloxane is hexamethylcyclotrisiloxane.

3. The process as in claim 1 wherein a second cyclic siloxane of the formula

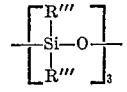

wherein R''' is an organic radical free of aliphatic-substituted halogen and is a member selected from the class consisting of monovalent hydrocarbon radicals, cyanoalkyl radicals and halogenated aryl radicals, said second cyclic siloxane being different from the cyclic siloxane employed in claim 1, is added to the reaction product of claim 1, under anhydrous conditions and the resulting mixture maintained at a temperature at which said second cyclic siloxane and said reaction product of claim 1 react to produce a block-block organopolysiloxane of the formula

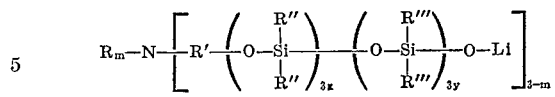

wherein R''' is as above-defined, R is a monovalent hydrocarbon radical, R' is an alkylene radical of from 1 to 10 carbon atoms or an arylene radical containing from 6 to 20 carbon atoms, R'' is an organic radical free of aliphatic substituted halogen and is a member of the class consisting of monovalent hydrocarbon radicals, cyanoalkyl radicals and halogenated aryl radicals, $x$ is an integer of at least 1, $y$ is an integer of at least 1 and $m$ is an integer of from 0 to 2 inclusive.

4. The process as in claim 3, wherein the product produced is treated so as to produce a polymer chainstopped with a member of the class consisting of hydrogen, organosilyl and acyloxy groups.

5. The process as in claim 1 in which the organolithium compound corresponds to the formula $(Li$—O—$C_2H_4)_3N$ and the cyclic polysiloxane is hexamethylcyclotrisiloxane.

6. The process as in claim 3 in which the reaction product of claim 1 has the formula

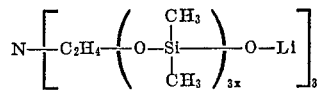

wherein $x$ is an integer having a value of at least 1, and the second cyclic polysiloxane is hexaphenylcyclotrisiloxane.

7. The process as in claim 1 in which the organolithium compound corresponds to the formula $(Li$—O—$C_2H_4)_2N$—$CH_3$

and the cyclic polysiloxane is hexamethylcyclotrisiloxane.

8. A composition of matter having the general formula

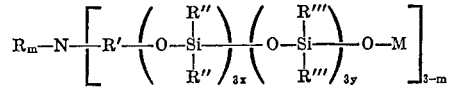

where R is a monovalent hydrocarbon radical, R' is an alkylene radical of from 1 to 10 carbon atoms or an arylene radical containing up to 20 carbon atoms, R'' and R''' are organic radicals free of aliphatic-substituted halogen and are members of the class consisting of monovalent hydrocarbon radicals, cyanoalkyl radicals and halogenated aryl radicals, M is a member of the class consisting of lithium, hydrogen, acyl and organosilyl, $m$ is a whole number from 0 to 2 inclusive, $x$ is an integer having a value of at least 1 and $y$ is an integer having a value of 0, 1 or more.

9. A composition as in claim 8 wherein M is lithium.

10. A composition as in claim 8 wherein M is a trimethylsilyl group.

References Cited

UNITED STATES PATENTS 3,337,494    8/1967    Bostick _____ 260—46.5

DONALD E. CZAJA, *Primary Examiner.*

M. I. MARQUIS, *Assistant Examiner.*